United States Patent
Marnon et al.

(10) Patent No.: US 10,073,465 B1
(45) Date of Patent: Sep. 11, 2018

(54) OPTICAL SENSOR SCANNING PLATFORM

(71) Applicant: Arete Associates, Northridge, CA (US)

(72) Inventors: Michael Francis Marnon, Longmont, CO (US); Paul Bryan Lundquist, Longmont, CO (US); Charles Patterson Forsyth, Longmont, CO (US)

(73) Assignee: Arete Associates, Northridge, CA (US)

( * ) Notice: Subject to any disclaimer, the term of this patent is extended or adjusted under 35 U.S.C. 154(b) by 0 days.

(21) Appl. No.: 15/365,940

(22) Filed: Nov. 30, 2016

Related U.S. Application Data

(60) Provisional application No. 62/261,056, filed on Nov. 30, 2015.

(51) Int. Cl.
| | |
|---|---|
| *G05D 1/08* | (2006.01) |
| *G05D 1/00* | (2006.01) |
| *G01J 1/02* | (2006.01) |
| *G01J 1/04* | (2006.01) |

(52) U.S. Cl.
CPC ............. *G05D 1/08* (2013.01); *G01J 1/0271* (2013.01); *G01J 1/0403* (2013.01); *G05D 1/0094* (2013.01); *G05D 1/0816* (2013.01); *G05D 1/0875* (2013.01)

(58) Field of Classification Search
None
See application file for complete search history.

(56) References Cited

U.S. PATENT DOCUMENTS

| | | | | |
|---|---|---|---|---|
| 7,082,003 | B2 * | 7/2006 | Correns | G01J 3/02 359/819 |
| 9,776,694 | B2 * | 10/2017 | Oledzki | B63G 8/001 |
| 2002/0177052 | A1 * | 11/2002 | Sogard | G03F 7/70883 430/9 |
| 2006/0245071 | A1 * | 11/2006 | George | G02B 3/12 359/665 |
| 2012/0137949 | A1 * | 6/2012 | Vosburgh | B63G 8/001 114/330 |
| 2012/0289103 | A1 * | 11/2012 | Hudson | F42B 19/00 440/38 |
| 2014/0259618 | A1 * | 9/2014 | Damus | B22D 31/00 29/463 |
| 2015/0177212 | A1 * | 6/2015 | Thomas | G01C 13/00 114/331 |
| 2015/0370252 | A1 * | 12/2015 | Hanson | B60F 5/00 701/2 |

* cited by examiner

*Primary Examiner* — Jonathan M Dager
(74) *Attorney, Agent, or Firm* — Furman IP Law

(57) ABSTRACT

Provided herein are systems and methods for scanning an optical sensor on a platform required to operate within a medium having a different pressure than the internal pressure of the sensor, including both underwater and high-altitude applications. For the case of underwater platforms, portions of the vehicle may be pulled or driven by propulsive forces through the water, whereas other portions of the vehicle may carry the platform for optical scanning, attached and rotationally controlled with respect to the driven portion of the vehicle. The platform may be rotated with respect to the portion that is pulled or driven through the water or other fluid. In some embodiments, that driven portion remains rotationally fixed with respect to the water. Other embodiments of vehicles in different environments may interface with different fluids or gasses and may be driven through the fluids or gases in similar manners.

25 Claims, 8 Drawing Sheets

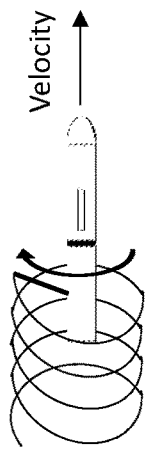
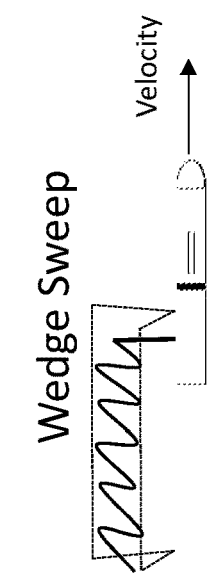
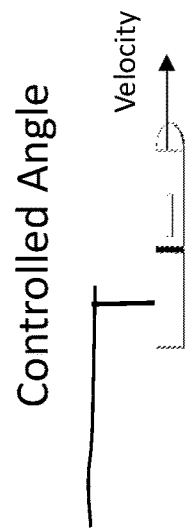
Fig. 6 Spiral Sweep
Fig. 7 Wedge Sweep
Fig. 8 Controlled Angle

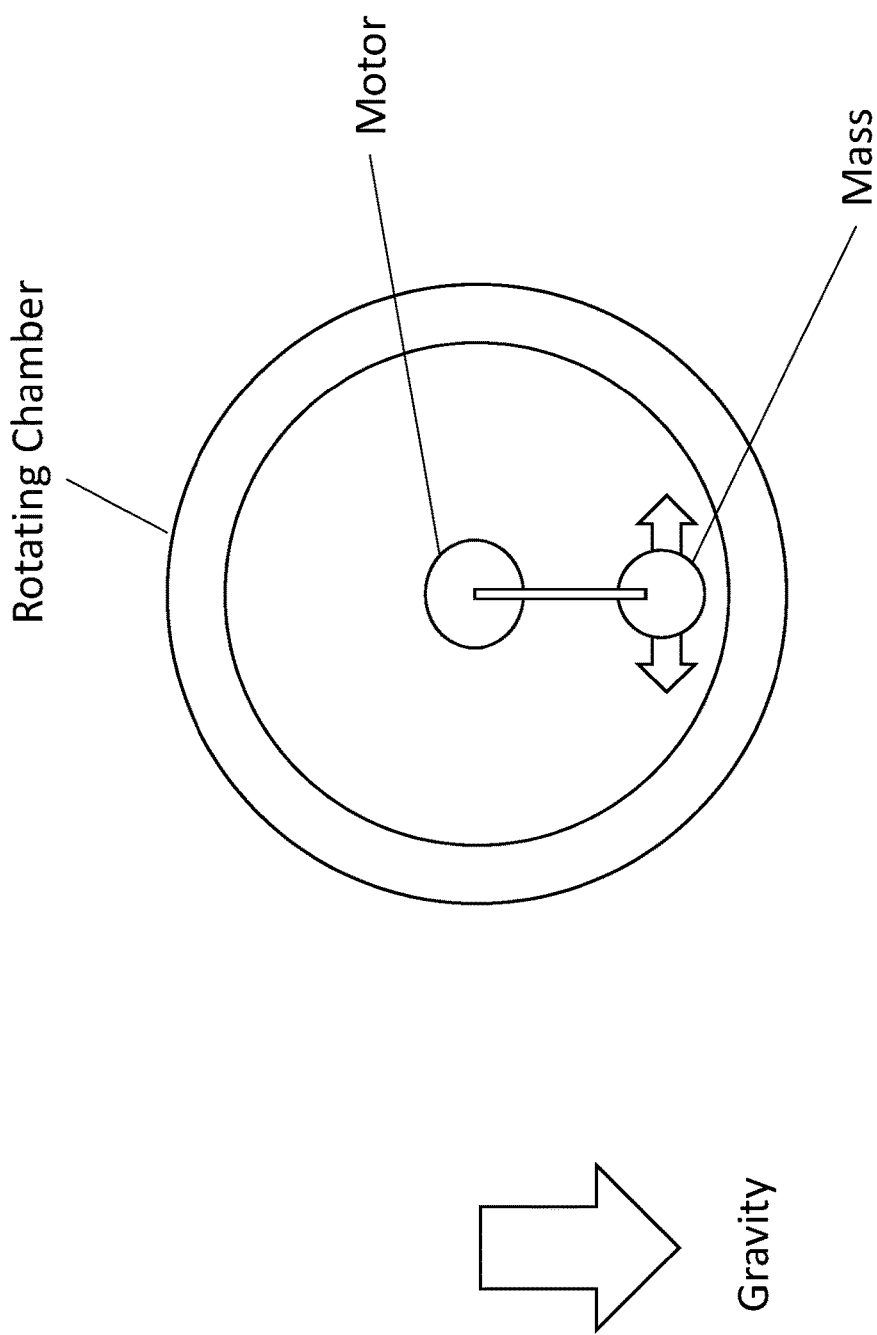

OPTICAL SENSOR SCANNING PLATFORM

RELATED APPLICATION AND PRIORITY CLAIM

This application claims the priority benefit of U.S. provisional application No. 62/261,056 filed Nov. 30, 2015 entitled Optical Scanning Sensor Platform, the disclosure of which is incorporated herein by reference for all purposes.

FIELD OF THE TECHNOLOGY

Embodiments of this disclosure relate to optical scanning sensor platforms and vehicles for carrying same within a medium having a different pressure than the internal sensor pressure.

SUMMARY OF THE DESCRIPTION

Provided herein are systems and methods for scanning an optical sensor on a platform required to operate within a medium having a different pressure than the internal pressure of the sensor. The disclosure is directed specifically to underwater platforms and vehicles which must withstand high relative external pressures, but the disclosure is also applicable to high altitude sensor platforms where relative internal pressures may be high. For the case of underwater platforms, portions of the vehicle may be pulled or driven by propulsive forces through the water, whereas other portions of the vehicle may carry the platform for optical scanning, attached and rotationally controlled with respect to the driven portion of the vehicle. In one embodiment, the platform is rotated with respect to the portion that is pulled or driven through the water. In some embodiments, that driven portion remains rotationally fixed with respect to the water. Other embodiments of vehicles in different environments may interface with different fluids or gasses and may be driven through the same in similar manners as discussed herein.

In one aspect, the disclosure describes a vehicle for carrying an optical sensor platform with a normal vector relative to the platform. The vehicle further includes a rotational pivot connected with the optical sensor platform that is configured to allow the normal vector of the optical sensor platform to rotate around an axis of travel of the vehicle. The vehicle further includes a rotational chamber containing the optical sensor platform and an optical aperture window for interfacing with a surrounding medium that allows for optical communication between the surrounding medium and the optical sensor platform. The rotational chamber is adapted to maintain a pressure difference across the optical aperture window, the pressure difference between an internal pressure of the rotational chamber and a pressure of the surrounding medium. The vehicle further includes a stable portion of the vehicle attached to the rotational chamber via the rotational pivot. The stable portion of the vehicle further includes means for stabilization to remain rotationally stable with respect to the rotational chamber around the rotational pivot and with respect to the direction of travel of the vehicle.

In another aspect, the disclosure describes an underwater vehicle comprising an optical sensor platform with a normal vector related to the platform and including a rotational pivot connected with the optical sensor platform that is configured to allow the normal vector of the optical sensor platform to rotate around an axis of travel of the underwater vehicle. The rotational chamber contains the optical sensor platform and an optical aperture for interfacing with the water that allows for optical communication between the water and the optical sensor platform. The rotational chamber is further adapted to maintain a pressure difference across the optical aperture, the pressure difference between an internal pressure of the chamber and a surrounding water pressure. The rotational chamber is attached to a stable portion of the vehicle via the rotational pivot and the stable portion of the vehicle is configured to remain rotationally stable with respect to the rotational chamber and with respect to the direction of travel of the underwater vehicle.

BRIEF DESCRIPTION OF THE FIGURES

FIGS. 6-8 illustrate three exemplary operational modes of a vehicle that may be utilized within various embodiments of the disclosure.

FIG. 6 shows an embodiment of a mode of operation and related vehicle.

FIG. 7 shows another embodiment of a mode of operation and related vehicle.

FIG. 8 shows yet another embodiment of a mode of operation and related vehicle.

FIG. 9 shows a cross section of such an embodiment in which a motor, attached to the rotation chamber, also rotates a mass that is attached to via a mechanical member.

Figure 1:
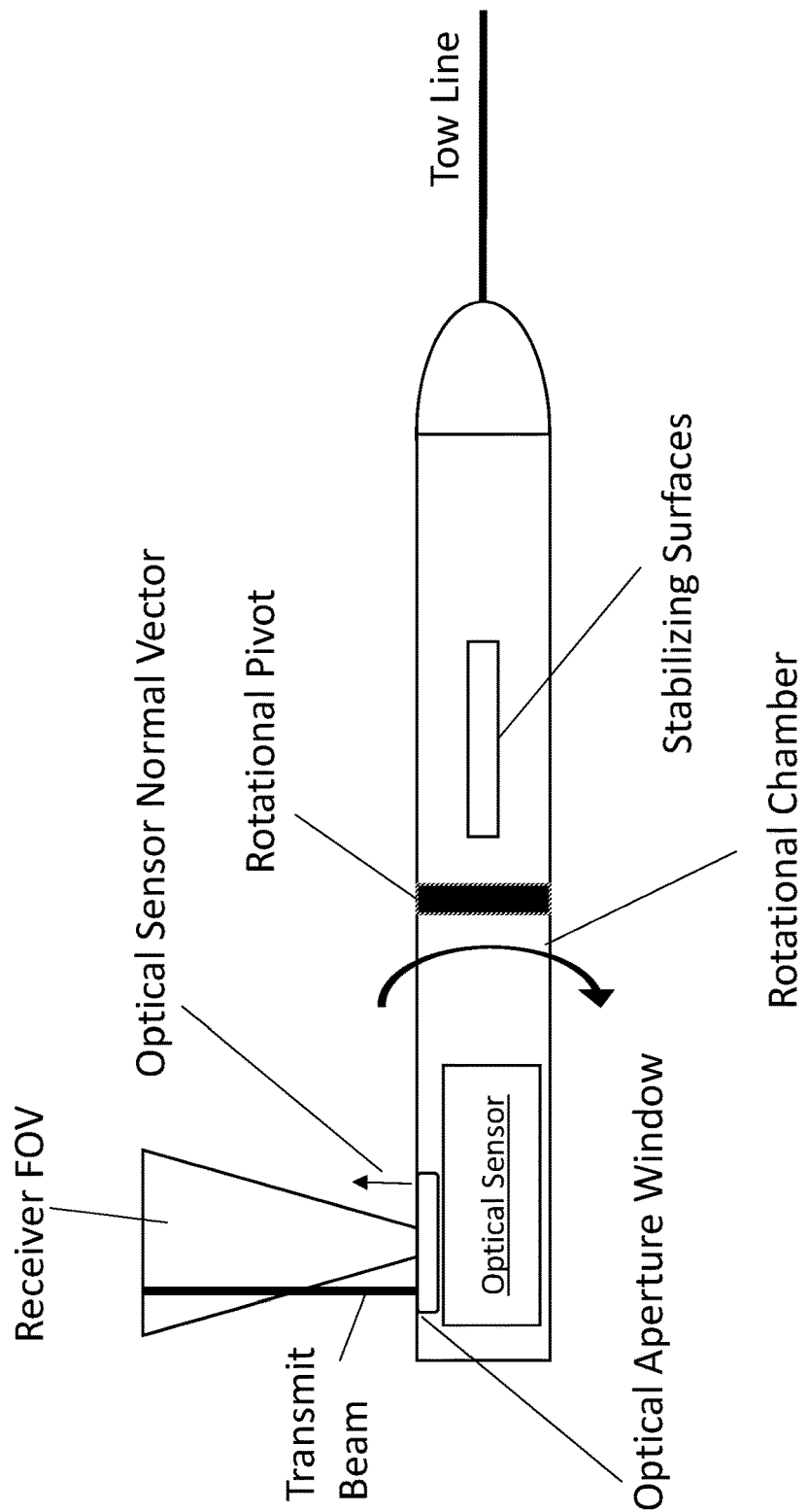
FIG. 1 illustrates an exemplary embodiment in which an underwater vehicle for carrying an optical sensor platform is towed by another platform (for example a surface ship, aircraft or another underwater vehicle).

Other embodiments and features of the present disclosure will be apparent from the accompanying drawings and from the detailed description which follows.

DETAILED DESCRIPTION OF THE DRAWINGS

The following patent description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one. Reference in this specification to "one embodiment" or "an embodiment" or the like means that a particular feature, structure, or characteristic described in connection with the embodiment is included in at least one embodiment of the disclosure. The appearances of the phrase "in one embodiment" or the like in various places in the specification are not necessarily all referring to the same embodiment, nor are separate or alternative embodiments mutually exclusive of other embodiments. Moreover, various features are described that may be exhibited by some embodiments and not by others.

Described herein are systems and methods of operating optical scanning on a sensor platform that rotationally moves with respect to a portion of a vehicle and/or an axis of travel for the vehicle. The vehicle may be towed or propelled through the water, as described further herein, and the movement through the water provides one direction of scanning through an underwater volume or set of surfaces, also as described further herein. The movement through the water of the optical platform is performed through both the vehicle's movement through the water, as well as a rotating optical platform rotating with the optical aperture. This rotating optical platform provides consistent scanning of a volume of underwater space by the optical platform when the vehicle is moved within the volume.

As described herein, in alternative embodiments, the axis of travel of a vehicle may be different from another axis of the vehicle, such as an axis of rotation of a rotating portion of the vehicle. Underwater vehicles are commonly streamlined along an axis of travel. However, vehicles may be streamlined in an axis that is not the same axis around which a rotating portion of the vehicle may move. The axis of travel may also be an axis around which the vehicle may be rotationally symmetric. Portions of the vehicle may be rotationally symmetric around one axis, that may or may not be the same as the axis of travel, and other portions of the vehicle may be symmetric around another axis. In other embodiments, the vehicle may not be rotationally symmetric around any axis.

In the illustrated embodiments, a rotating portion of the vehicle rotates with respect to the axis of travel for the vehicle. The vehicle also includes a stable portion of the vehicle that does not rotate with respect to the axis of travel of the vehicle while the rotating portion of the vehicle is rotating. The stable portion therefore is described herein as stable only with respect to the rotating motion around an axis of travel.

The rotating portion of the vehicle includes a fixed Optical Aperture allowing transmitted and received beams to enter. In one embodiment, these beams are transmitted through the same physical optical aperture. In another embodiment, there are separate transmit and receive physically-distinct optical apertures. As used herein, the term physical optical aperture refers to an aperture that is a physically-distinct optical aperture, even if multiple actual optical apertures are contained therein, such as through a large aperture window through which separate transmit and receive optical apertures are maintained. An optical aperture may be a flat window or may be a window having an optical power. For example, an optical aperture may be a lens that is configured to image received radiation.

An optical aperture for an underwater vehicle maintains the pressure difference between the outside and the inside. In many cases high altitude vehicles must maintain a pressure difference between the outside and inside as well. As described herein, optical apertures are designed to maintain pressure differentials between the optical components, such as the Turn Mirror, Beam Expander, Laser, and the exterior pressure. These requirements to withstand or regulate the pressure difference while transmitting and receiving light without undue distortion provides engineering challenges limiting the optical apertures usable for optical platforms on vehicles. Pressure may be regulated at times within the optical platform (e.g., against the optical aperture) such that the pressure is greater than or equal to a certain relative external pressures.

The rotating sensor platform is mounted within the rotating chamber of the vehicle to rotate with respect to the axis of travel of the vehicle. Rotation may be performed at a right angle or normal with respect to the axis of vehicle travel. Alternatively, scans may be performed along an axis of rotation that is skewed with respect to the axis of travel. For example, such a skewed path of rotation may be used to map certain underwater volumes that are forward-looking or backward-looking with respect to the axis of travel for the vehicle. Travel of the vehicle can induce the rotation, such as through control surfaces and utilizing propulsion from surrounding water flow.

The optical platform can include a scanning mirror that can scan in a number of ways with respect to the rotation of the optical platform. Scan mirror can rotate with respect to the platform, scanning an optical beam in combination with the rotating platform. The scanning of the mirror can be performed in conjunction with the rotational motion of the rotating portion of the vehicle to create composite scanning motions. The optical aperture must include any scan angles covered by any scan mirror(s) included on the optical platform, thus further scanning increases the demands on providing a large optical aperture that transmits light while maintaining extreme pressure differentials.

A fixed or scanning Turn Mirror may be used for each beam transmitted or received, depending on the optical application of the optical platform. The Turn Mirror is mounted or otherwise physically connected with the rotating portion of the vehicle (e.g., via an optical platform) to rotate the transmit beam and receive beam into and out of an optical volume. This provides a rotating scanning of the optical beams through the volume while limiting the physical requirements of the optical aperture through which the rotating beams must pass.

The optical platform may include many other components, as shown in the illustrated embodiments. For example, other components may include passive physical components like the Beam Expander and active or electronic components such as Data & Acquisition Controls. The optical platform that rotates may interface with a second optical platform on the vehicle that does not rotate or rotates differently from the first optical platform. The optical platform that is being rotated may include a lidar system for delivering transmitted radiation and detecting received radiation and determining properties of an underwater volume or an array of underwater surfaces that are scanned through the rotating aperture or apertures. Alternatively, the optical platform that is being rotated may include an imaging system, including imaging for use in camera style lidar setups.

There may be more than one rotating portion of the vehicle in an alternate construction of the vehicle shown in the oblique view. In an alternative embodiment, the front towed portion of the vehicle may be caused or allowed to rotate separately from a medial portion of the vehicle that is stabilized to rotation along the axis of travel by the illustrated control surfaces. For example, the towed portion may be rotated by a driving engine (intentionally or unintentionally) that is towing the vehicle. In the embodiment illustrated herein, the medial portion is held rotationally stable with respect to the rotating portion at the rear of the vehicle that is carrying the rotating optical platform and optical aperture.

A rotational chamber may be included in a rotating portion of the vehicle. For example, the rotational chamber contains the optical cavity for containing the optical platform interfacing with the optical aperture. In the illustrated embodiments, the rotational chamber is contained, surrounded, and attached to the rotating portion of the vehicle. In one embodiment, the rotational chamber is configured to be rotated by the process of rotating a mass within the rotational chamber. In another embodiment, the rotating chamber and the rotating portion of the vehicle are configured to be rotated by the process of rotating a mass within the rotational chamber and/or by the process of rotating a mass with the rotating portion of the vehicle.

In one embodiment, the rotating portion of the vehicle or the rotational chamber within a rotating portion of the vehicle is adapted to rotate in a continuous circular motion. In another embodiment, the rotating portion of the vehicle or the rotational chamber within a rotating portion of the vehicle is adapted to rotate alternatively back and forth in a periodic motion.

The rotating portion of the vehicle is connected via a Slip Ring to the stable portion of the vehicle. The Slip Ring may be positioned at different radii around a rotational axis between the stable portion and the rotating portion of the vehicle. The Sensor Rotation Motor or other feedback mechanism may be used to control the angle of rotation of the vehicle portions around the Slip Ring. The mechanisms for implementing the Sensor Rotation Motor may include different configurations of rollers and motors, both inside and outside the vehicle, as well as in either or both the interior chambers of the rotating and stable portions of the vehicle. The mechanisms may mate with either or both the Slip Ring and the vehicle chassis.

The Slip Ring may pass electrical signals, data, power, sensor signals, etc. across the interface between the rotating and stable portions of the vehicle. Various signals may be passed between the portions, including, as described further herein, to control the rotational scanning of the optical aperture across the volume to be inspected. For example, scanning mirrors may be controlled with the help of feedback signals from the stable portion of the vehicle to control the scan of optical platform based on the control applied to the stable portion.

In the embodiment illustrated, the front of the vehicle may include an eyelet for towing, allowing the vehicle to be towed by either a vehicle on the surface of the water, in the air, or another underwater vehicle. Also as shown, the vehicle is designed to be unmanned, with no human operator on board to control the vehicle's path through the water. Other embodiments include motors either integral to the vehicle, attached or external to the vehicle for propelling the vehicle through the water. As described further herein, these means of propulsion of the vehicle may be included in the control surfaces and/or may be included on the rotating portion of the vehicle.

Control surfaces may be used with control actuators to create a stabilized or controlled path of the vehicle through the water, including a controlled amount of yaw, pitch and roll of the vehicle. As shown in the oblique view of the illustrated embodiments, the control surface(s) may be seated on a portion of the vehicle that is rotationally-separated from a driven (e.g., towed) portion, and a rotating portion of the vehicle containing the optical aperture to be rotated and scanned across the volume to be inspected by the vehicle. In other embodiments, described further herein, the control surfaces of the vehicle can be included on other portions of the vehicle, including the drive or towed portion and/or the rotating portion of the vehicle.

In the embodiment illustrated, a control system is included in the stable portion of the vehicle. The control system illustrated includes Vehicle Control Electronics connected to Control Actuators for controlling a Control Surface on the stable portion of the vehicle and a Sensor Rotation Motor that is connected to the rotating portion. Other means may be used for controlling the control surfaces and/or the rotational motion of the rotating portion of the vehicle. These means are described further herein.

The illustrated embodiments of the vehicle may include a feedback loop that includes these controlling means in the stable portion of the vehicle. The feedback loop may be physically located in either or both of the rotating portion and the stable portion of the vehicle. For example, a sensor or motor controlling rotation may be included in rotating portion of the vehicle. The feedback loop may maintain both relative rotational position of the rotating and stable portion, as well as the movement of the rotating or the stable portion with respect to the water via control surfaces on the vehicle. For example, a control surface may be mounted like the illustrated blade or a fin on a medial line of the vehicle. More complex control surfaces may be further included such as wings that integrate with a flattened (i.e., non-cylindrical) body of vehicle or that integrate with drive systems.

Inertial and other sensors (e.g., gyroscopes) may be used to determine the direction of travel of the vehicle, and may be used for the feedback loop to sense and control the yaw, pitch, and roll of the vehicle. The control actuators and control surfaces shown, as well as other surfaces and control actuators may be used to create more complex vehicles from the exemplary embodiment illustrated. The means for stabilization control via the control surfaces may include complex control surfaces, such as surfaces integrated with the drive means or with the body of the vehicle. For example, controllers on the driven portion may change the water flow over the body of the vehicle, providing a stabilizing force. The water flow over the vehicle may be further modified by passive or active surfaces of the vehicle to create the stabilizing forces to the portions of the vehicle. As described further herein, the drive means may be interfaced with the rotating portion of the vehicle, providing drive and relative rotation of the portion of the vehicle containing the optical platform. The drive means may be a towing line, such as through the illustrated towing eyelet.

The driven portion of the vehicle may be rotated with the rotating portion of the vehicle. Alternatively, the driven portion of the vehicle may be rotated separately. In another embodiment, the driven portion may be held rotationally stable with a stable portion of the vehicle, for example, as illustrated with a towing eyelet. In another embodiment, the drive means may be a water jet or other non-rotational means for propulsion. As further described herein, portions of a towing mechanism, such as a buoy or cable may be considered parts of the driven portion of the vehicle.

The further detailed descriptions of specific illustrated embodiments of the Figures are meant to exemplify the previously more-generally discussed embodiments, including, the "illustrated embodiments."

FIG. 1 illustrates an exemplary embodiment in which an underwater vehicle for carrying an optical sensor platform is towed by another platform (for example a surface ship, aircraft or another underwater vehicle). The front portion of the vehicle is stabilized by surfaces protruding from the vessel. A trailing rotational chamber is attached to the front portion of the vehicle via a rotational pivot and contains an optical sensor. The rotational pivot may include a slip ring for transmitting power and/or signals, especially if the tow line include an electrical umbilical for power and signal transmission to the towing platform. The optical sensor, in this embodiment, both transmits an illuminating source and receives optical radiation through an optical aperture window. Specifically, the system is configured as a lidar system for remote sensing applications in which range dependent optical properties are sensed by a receiver. Sensed properties may include hard surface reflections, fluorescence, and/or back scatter. However, the disclosure is not limited to lidar or active optical sensor applications.

In other embodiments, the receiver may consist of a camera system, while in still other embodiments the transmit beam may illuminated the surrounding medium. An optical axis for the receiver is aligned to a normal vector to the optical window aperture.

Figure 2:
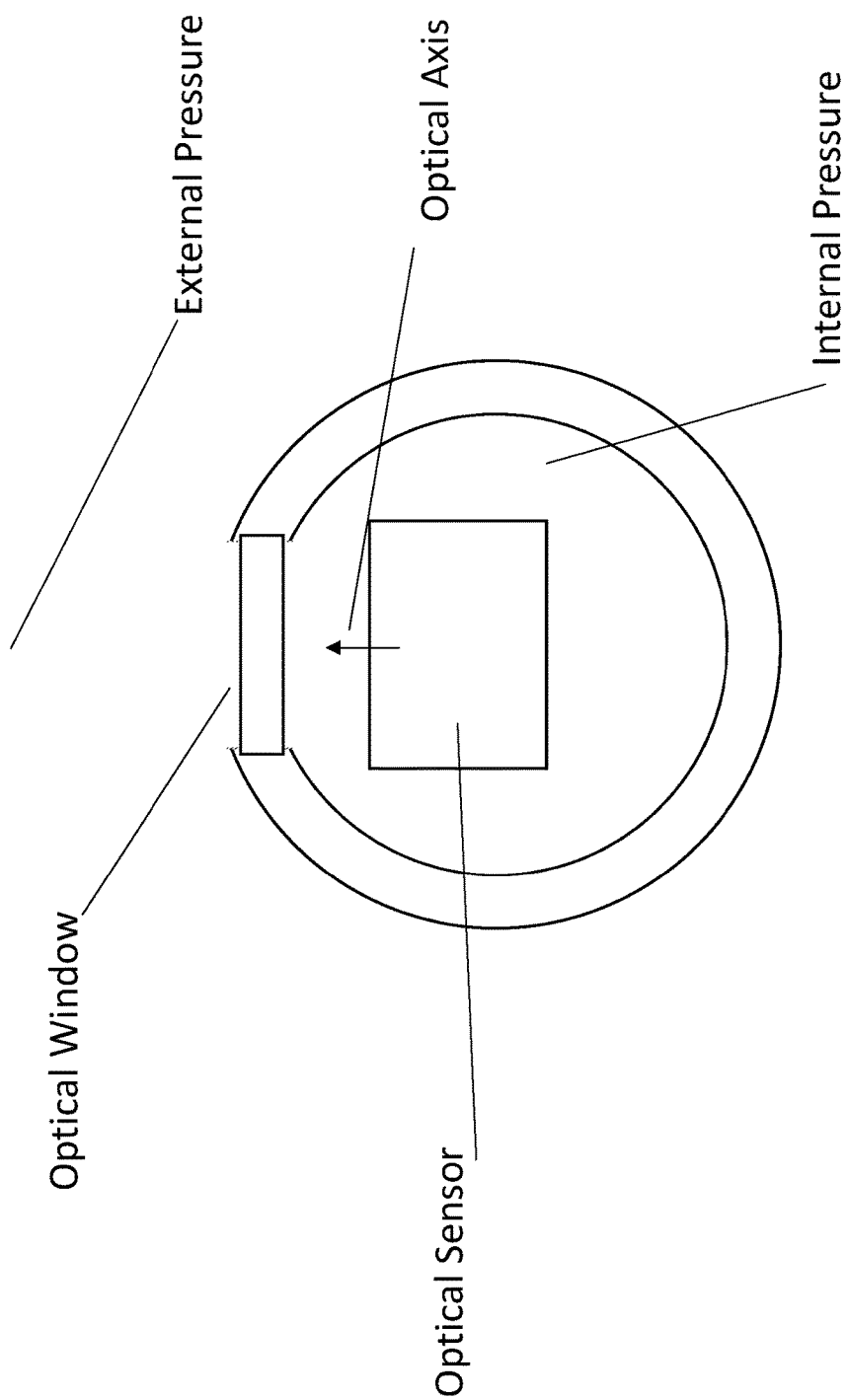
FIG. 2 shows a cross section of the rotational chamber in an embodiment of the disclosure in which the internal pressure and external pressure are substantially different.

FIG. 2 shows a cross section of the rotational chamber in an embodiment of the disclosure in which the internal pressure and external pressure are substantially different. Exemplary environments for which this is the case are underwater vehicles and high altitude vehicles. To withstand the pressure difference without substantial mechanical distortion of the window, the window is designed with a thicker aspect ratio (e.g. the design is driven to a thicker window and a smaller external area of the window). By rotating the chamber that houses the optical sensor, the field of regard of the contained optical sensor is increased well beyond what could be achieved without rotation. This is particularly important when large differences between the internal and external pressure limit the external area of the window.

Figure 3:
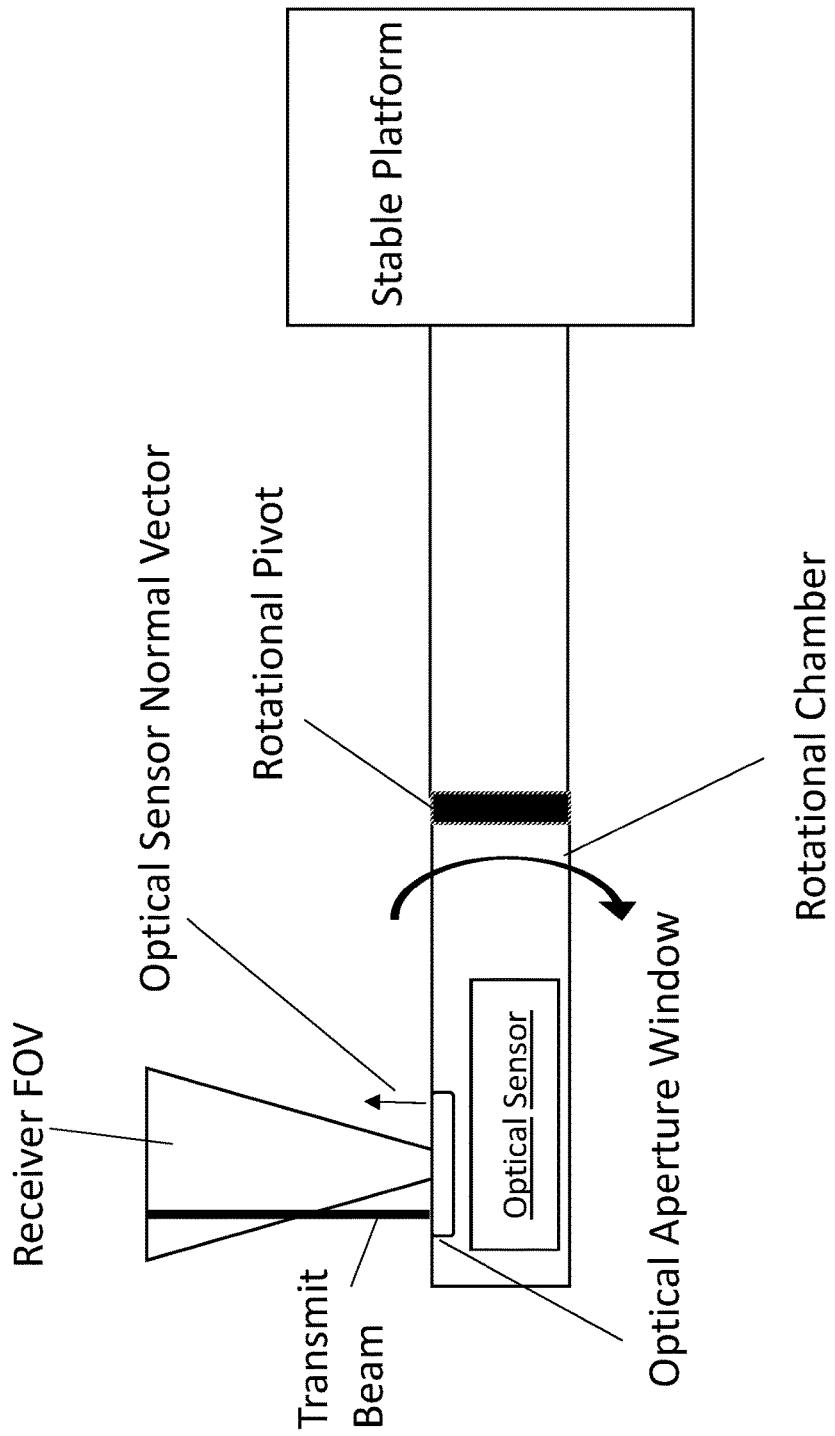
FIG. 3 illustrates an embodiment of wherein the vehicle is attached to another stable platform that may be either stationary or moving.

FIG. 3 illustrates an embodiment of wherein the vehicle is attached to another stable platform that may be either stationary or moving. This embodiment may be contrasted in some aspects with the embodiment illustrated in FIG. 1 in which the vehicle is towed.

Figure 4:
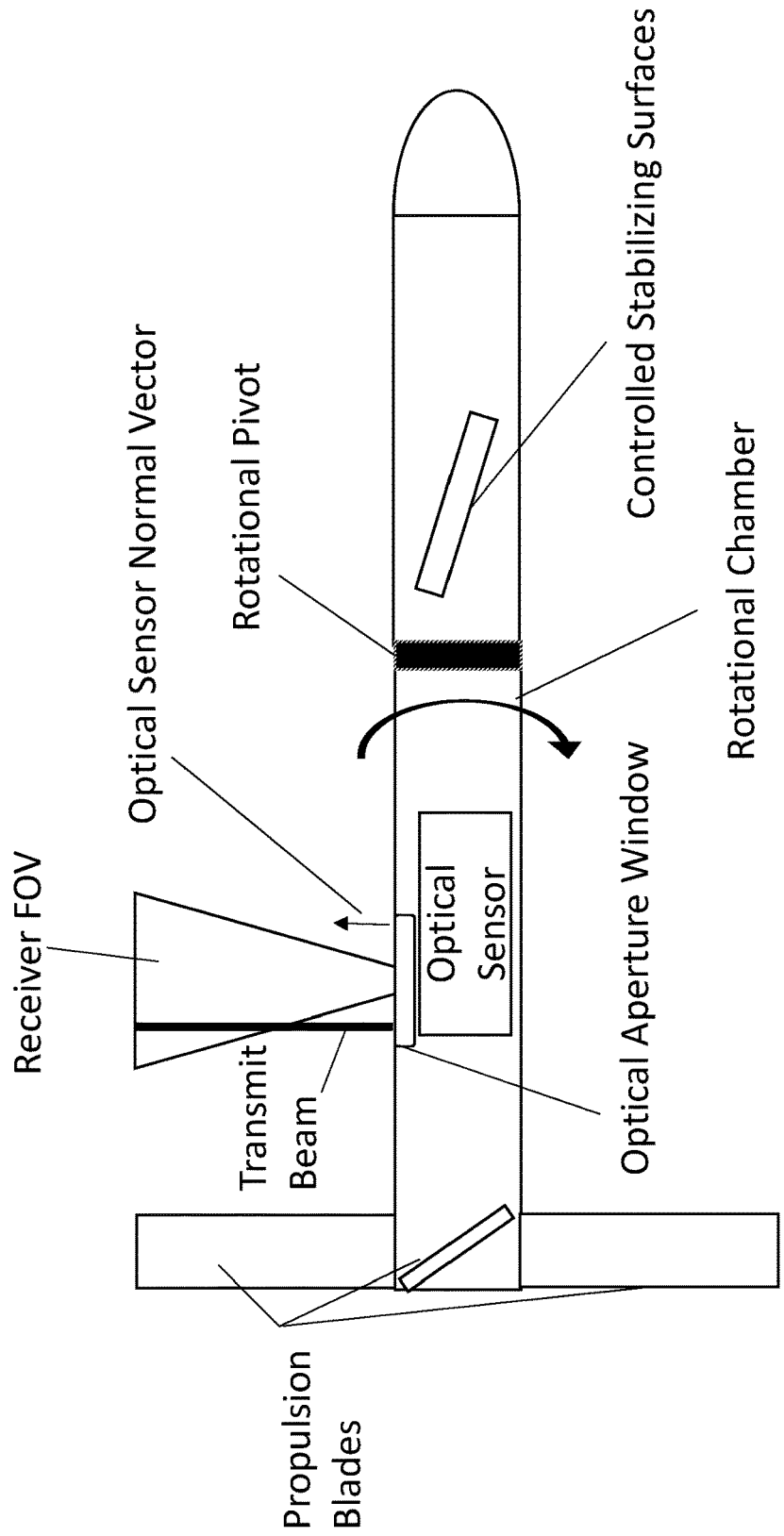
FIG. 4 illustrates yet another embodiment, in which the rotational chamber is attached to propulsion blades that utilize the rotational motion to propel the vessel through a fluid environment.

FIG. 4 illustrates yet another embodiment, in which the rotational chamber is attached to propulsion blades that utilize the rotational motion to propel the vessel through a fluid environment. The embodiment as shown in FIG. 4, further illustrates stabilizing surfaces which are controlled so as to counter the torque resulting from the rotational pivot. The angle of the controlled stabilizing surfaces may be dynamically adjusted.

Figure 5:
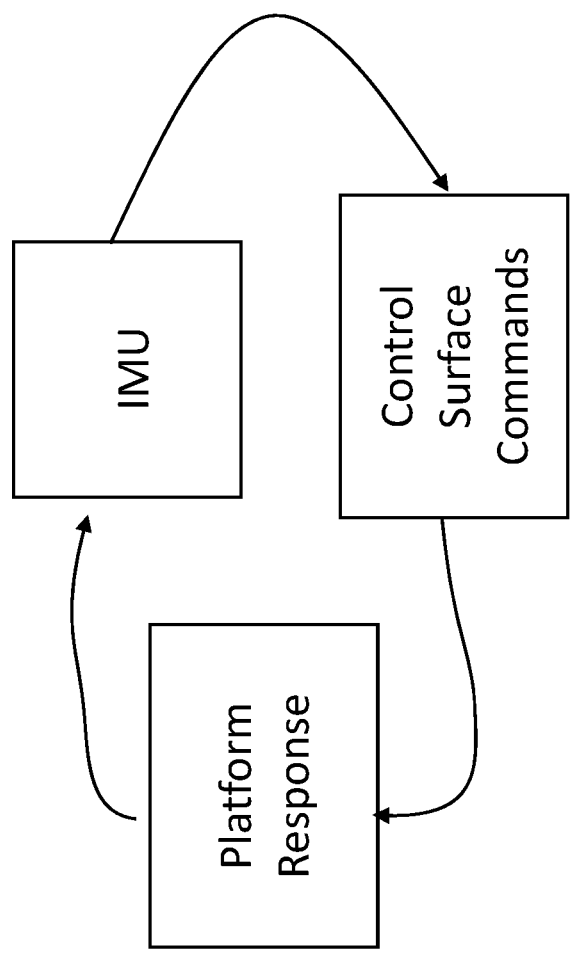
FIG. 5 illustrates an embodiment of a feedback loop to maintain the roll angle of the stable portion of the vehicle.

FIG. 5 illustrates an embodiment of a feedback loop to maintain the roll angle of the stable portion of the vehicle. An Inertial Measurement Unit (IMU) or other orientation sensor is used to measure the orientation of the stable portion of the vehicle relative to gravity. The orientation measurement is used to determine controls for the orientation of controlled surfaces on the vehicle. This determination may be based, for example, on proportional corrections, look-up tables or other common algorithmic control methods. The orientation of the control surfaces results in torque on stable portion of the vehicle resulting in the platform undergoing a rotating response which is, in turn, sensed by the IMU (or orientation sensor).

FIGS. 6-8 illustrate three exemplary operational modes of a vehicle that may be utilized within various embodiments of the disclosure.

FIG. 6 shows an embodiment of a mode of operation and related vehicle. The rotational chamber undergoes continuous rotation, so that the field of regard for the optical sensor comprises a circular or spiral region of interrogation.

FIG. 7 shows another embodiment of a mode of operation and related vehicle. In some circumstances, where more overall dwell time is desired within a limited field of regard, a wedge sweep may be utilized as shown in FIG. 7. In the wedge sweep mode of operation, the rotational chamber undergoes an oscillatory rotation within a limited range of rotation angles.

FIG. 8 shows yet another embodiment of a mode of operation and related vehicle. The rotational chamber may have a controlled angle that may be rotated in response to operational or sensed motivations. For example, the rotational angle may be controlled to track a specific optical feature or a specific hard target.

While there are many ways to rotate the rotational chamber, one embodiment rotationally redistributes the weight within the rotational chamber to induce rotation.

FIG. 9 shows a cross section of such an embodiment in which a motor, attached to the rotation chamber, also rotates a mass that is attached to via a mechanical member. The weight of the mass provides a torque that rotates the rotating chamber.

Figure 10:
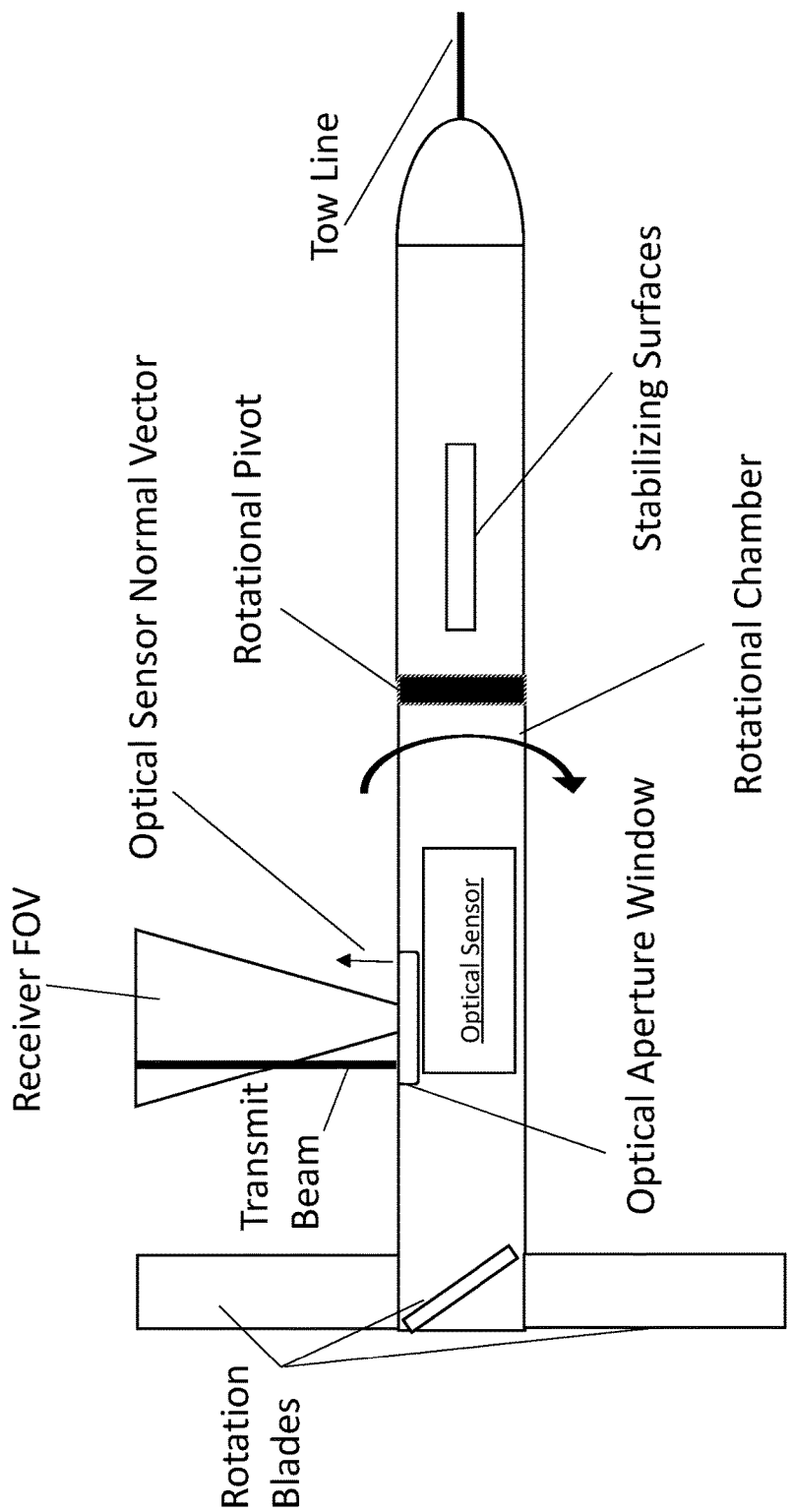
FIG. 10 shows yet another embodiment of the vehicle is towed from a tow line and rotation blades are used to rotate the rotational chamber as it is towed through a fluid.

FIG. 10 shows yet another embodiment of the vehicle is towed from a tow line and rotation blades are used to rotate the rotational chamber as it is towed through a fluid.

This patent description and drawings herein are illustrative and are not to be construed as limiting. It is clear that many modifications and variations of this embodiment can be made by one skilled in the art without departing from the spirit of the novel art of this disclosure. While specific parameters, including device configurations, parameters of components, other reference points can also be used. These modifications and variations do not depart from the broader spirit and scope of the present disclosure, and the examples cited here are illustrative rather than limiting.

What is claimed is:

1. A system, comprising:
   a vehicle for carrying an optical sensor platform with a normal vector relative to the platform;
   a rotational pivot connected with the optical sensor platform that is configured to allow the normal vector of the optical sensor platform to rotate around an axis of travel of the vehicle;
   a rotational chamber containing the optical sensor platform and an optical aperture window for interfacing with a surrounding medium that allows for optical communication between the surrounding medium and the optical sensor platform;
   wherein the rotational chamber is adapted to maintain a pressure difference across the optical aperture window, the pressure difference between an internal pressure of the rotational chamber and a pressure of the surrounding medium;
   a stable portion of the vehicle attached to the rotational chamber via the rotational pivot; and
   the stable portion of the vehicle further including:
   means for stabilization to remain rotationally stable with respect to the rotational chamber around the rotational pivot and with respect to the direction of travel of the vehicle.

2. The system of claim 1, wherein the pressure of the surrounding medium is a higher pressure than said internal pressure of the rotational chamber.

3. The system of claim 1, where the means for stabilization are mechanical attachments to a stable platform.

4. The system of claim 1, wherein the means for stabilization are stabilizing surfaces.

5. The system of claim 4, wherein the stabilizing surfaces are controlled stabilizing surfaces.

6. The system of claim 1, further comprising a rotational feedback control system to maintain roll angle of the stable portion with respect to the direction of travel.

7. The system of claim 1, wherein the vehicle is towed by an external platform.

8. The system of claim 1, wherein the rotational chamber further comprises a propulsion system.

9. The system of claim 8, wherein the propulsion system is non-rotating.

10. The system of claim 1, wherein the rotational chamber is connected to the stable portion of the vehicle via a slip ring.

11. The system of claim 10, wherein the slip ring transmits electrical signals between the rotational chamber and the stable portion of the vehicle.

12. The system of claim 1, wherein a rotational position of the rotational chamber is controlled by one or more motors and one or more rollers mounted to the stable portion of the vehicle and mechanically-interfaced with the rotational chamber.

13. The system of claim 1, wherein a rotational position of the rotational chamber is controlled by one or more motors and one or more rollers mounted to rotational chamber, and mechanically-interfaced with the stable portion of the vehicle.

14. The system of claim 1, further comprising a rotation sensor for measuring relative angle between the rotational chamber and the stable portion of the vehicle around the rotational pivot.

15. The system of claim 1, further comprising a control system for actively controlling rotation of the rotational chamber in real-time.

16. The system of claim 1, wherein the pressure of the surrounding medium is lower than the internal pressure of the rotational chamber.

17. The system of claim 1, wherein the means for stabilization includes rotational propulsion of the vehicle.

18. The system of claim 1, wherein the vehicle is an underwater vehicle.

19. The system of claim 18, wherein the rotational chamber is rotated due to surface interactions of the vehicle with a portion of the surrounding water flow.

20. The system of claim 1, wherein the optical aperture window is substantially flat.

21. The system of claim 1, wherein the optical aperture window includes an optical component with an optical power.

22. The system of claim 1, wherein the rotational chamber is configured to be rotated by rotating a mass within said rotational chamber.

23. The system of claim 1, wherein the rotational chamber is adapted to rotate in a continuous circular motion.

24. The system of claim 1, wherein the rotational chamber is adapted to rotate back and forth in a periodic motion.

25. The system of claim 1, wherein the vehicle is a high altitude vehicle.

* * * * *